United States Patent [19]
Pouit

[11] Patent Number: 5,659,320
[45] Date of Patent: Aug. 19, 1997

[54] METHOD AND DEVICE FOR DETERMINING THE SPEED OF A MOVING OBJECT BY MEANS OF A PULSE-COMPRESSION RADAR OR SONAR

[75] Inventor: Christian Pouit, Rueil Malmaison, France

[73] Assignee: Societe Nationale Industrielle Aerospatiale, Paris, France

[21] Appl. No.: 560,274

[22] Filed: Nov. 21, 1995

[30] Foreign Application Priority Data

Dec. 1, 1994 [FR] France .................................. 94 14441

[51] Int. Cl.$^6$ .................................................. G01S 13/536
[52] U.S. Cl. .......................... 342/115; 342/189; 342/109; 342/145
[58] Field of Search ..................... 342/109, 112, 342/115, 129, 130, 145, 189, 200, 104

[56] References Cited

U.S. PATENT DOCUMENTS

| | | | |
|---|---|---|---|
| 4,241,347 | 12/1980 | Albanese et AL. | 342/89 |
| 4,593,287 | 6/1986 | Nitardy | 342/200 |
| 4,849,760 | 7/1989 | Solie | 342/104 |
| 5,151,702 | 9/1992 | Urkowitz | 342/134 |
| 5,294,932 | 3/1994 | Nagel | 342/109 |
| 5,537,120 | 7/1996 | Willmore | 342/15 |

FOREIGN PATENT DOCUMENTS

4119509 A1  12/1992  Germany.

OTHER PUBLICATIONS

Applied Optics, vol. 31, No. 6, dated Feb. 20, 1992, pp. 801–808 "Effects of speckle on the range precision of a scanning lidar".

Primary Examiner—John B. Sotomayor
Attorney, Agent, or Firm—Marshall, O'Toole, Gerstein, Murray & Borun

[57] ABSTRACT

A method and device of the pulse-compression radar or sonar type which makes it possible to determine the speed of a moving object is provided with a transmitter system, a receiver system, and a signal processing system. The transmitter system is capable of transmitting two associated pulses, one of which is modulated with an increasing variation law and the other of which is modulated with a decreasing variation law. The signal processing system includes two correlators, an adder, a subtractor, and a computer.

9 Claims, 3 Drawing Sheets

METHOD AND DEVICE FOR DETERMINING THE SPEED OF A MOVING OBJECT BY MEANS OF A PULSE-COMPRESSION RADAR OR SONAR

BACKGROUND OF THE INVENTION

The present invention relates to a method for determining, by means of a remote detection device of the pulse-compression radar or sonar type, the speed of a target which is moving toward said remote detection device, as well as to a device for implementing said method.

In the context of the present invention, pulse is understood to mean a group of oscillations capable of being subjected to compression as described below.

For reasons of simplification of the description, the invention will be presented hereinafter solely in relation to a remote detection system of the radar type. However, all the characteristics of the invention which will be presented by reference to such a radar clearly apply in the same way equally to a sonar.

The present invention applies more precisely to pulse-compression radars or sonata which transmit frequency-modulated pulses with a linear and continuous variation law. In a normal way, such pulses transmitted by a radar are picked up after reflection on a target to be analyzed, then are processed. The processing is intended to reduce their duration and to increase their amplitude. These pulses thus processed or "compressed" make it possible very precisely to calculate the distance between said target and said radar. It is thus possible to equip such a pulse-compression radar with a precise rangefinding means exhibiting good range resolving power.

However, the range measurements performed by a radar equipped with such a rangefinding means are falsified when the target is moving with respect to said radar, by reason of a phenomenon of ambiguity between the speed and the range which is characteristic of linear frequency modulation. For example, when the radar transmits a pulse the frequency of which increases linearly over time, a moving target which is traveling away from said radar is located at a greater range than the true range, and conversely when the moving target is approaching said radar. These measurement errors are reversed when the radar transmits a pulse the frequency of which decreases over time.

In a known way, this defect of the pulse-compression radar can be eliminated by modulating the transmitted pulse, with an increasing frequency law during the first half of the transmission duration, then with a decreasing frequency law during the second half of the transmission duration, or conversely. Under these transmission conditions, the pulse picked up and processed makes it possible precisely to calculate the distance between the moving target and the radar.

The object of the present invention is to associate with such a pulse-compression radar, making it possible precisely to determine the range of a target, a means making it possible moreover to determine the speed of said target when the latter is moving toward said radar.

It will be noted that the document U.S. Pat. No. 5 294 932 discloses a method making it possible simultaneously to measure the speed and the range of a moving target by means of a radar. However, this method applies to a radar with high recurrence frequency which is by design, extremely precise for speed measurement and which is particularly well adapted to the airborne-radar surveillance function. The method described in this document makes it possible to combine, with this speed measurement, range measurement which, however, exhibits a limited accuracy.

Consequently, the above-mentioned American document and the present invention apply to different types of radar, both in terms of the frequencies used and in terms of the measurements performed, since the present invention is implemented, as previously indicated, in a pulse-compression radar which operates at low or medium recurrence frequency and which is, by design, very accurate for range measurement. This operating mode is employed, in particular, in remote detection radars.

No means currently exists making it possible to determine the speed of a moving target from such a pulse-compression radar.

SUMMARY OF THE INVENTION

The object of the present invention is to fill in this gap in the state of the art.

To this end, according to the invention, the method for determining, by means of a remote detection device of the pulse-compression radar or sonar type, the speed of an object moving toward said remote detection device, is noteworthy in that:

two associated pulses are transmitted, frequency-modulated with linear and continuous variation laws, one of said pulses being modulated with an increasing variation law and the other with a decreasing variation law;

said pulses are detected after they are reflected on said moving object; and said detected pulses are processed so as to reduce their duration and to increase their amplitude, a sum signal is formed by adding the two pulses thus processed;

a difference signal is formed by subtracting the two pulses thus processed; and the speed of the moving object is deduced from said sum and difference signals.

Thus, by virtue of the invention, it is possible to measure the speed of a moving object by means of a pulse-compression radar or of a sonar, on the basis of the processing of said two pulses.

Moreover, these two pulses are frequency-modulated, respectively with an increasing variation law and a decreasing variation law, which makes it possible to overcome the ambiguity phenomenon previously described and existing between the speed and the range with linear frequency modulation, so as to be able to make a non-erroneous range measurement simultaneously with said speed measurement.

It will be noted that several known methods exist for calculating the speed of the moving object on the basis of said sum and difference signals. However, for preference, said speed is determined by means of the following operations:

the difference signal is divided by the maximum value of the sum signal;

the derivative of the difference signal thus divided is calculated; and the speed of the moving object is deduced from said derivative, said derivative being proportional to the speed at the instant when said sum signal exhibits its maximum value.

According to one advantageous characteristic of the invention, the two pulses, modulated respectively with an increasing law and with a decreasing law, are transmitted simultaneously, which makes it possible to perform the calculations as soon as these two detected pulses are received, obviously simultaneously, and makes it possible to simplify the device intended for implementing the method. It will be noted, in this case, that the speed of the moving object can therefore be calculated from a single detection of pulses.

However, according to a variant embodiment of the invention, it is also possible to transmit the two pulses successively after a defined time delay, and, in this case, this time delay is taken into account upon detection and upon processing of the pulses, after they have been reflected on the moving object.

As previously stated, the remote detection device to which the invention is applied still makes it possible precisely to determine the distance between the moving object and said remote detection device. For preference, this distance is determined, according to the invention, on the basis of said sum signal.

The present invention also relates to a remote detection device for implementing the aforementioned method.

According to the invention, said remote detection device of the type including:

- a transmitter system capable of transmitting frequency-modulated pulses;
- a receiver system capable of detecting the pulses transmitted by said transmitter system and reflected by the moving object; and
- a signal processing system associated with said receiver system, is noteworthy in that said transmitter system is capable of transmitting two associated pulses, one of which is modulated with an increasing variation law and the other of which is modulated with a decreasing variation law, and in that said signal processing system includes:

- two correlation means intended to reduce the duration and to increase the amplitude of the detected pulses, each of said correlation means being adapted to one of said pulses;
- an addition means intended to carry out the addition of the two processed pulses;
- a subtraction means intended to carry out the subtraction of the two processed pulses; and
- a computer linked to said addition and subtraction means, and capable of determining the speed of the moving object.

Advantageously, said transmitter system includes:

- a signal generator capable of generating a signal modulated by increasing frequencies;
- a signal generator capable of generating a signal modulated by decreasing frequencies;
- a summing means grouping together the signals generated by said signal generators; and
- a transmission means controlled by said signals and transmitting corresponding pulses.

Moreover, when the two pulses are transmitted successively after a defined duration, the device in accordance with the invention advantageously includes a delay system which is mounted in series with the correlation means processing the pulse transmitted first, said delay system delaying the forwarding of the received information for a time corresponding to said defined duration.

Moreover, according to a variant embodiment of the invention, a delay system, delaying forwarding of the information received for a defined duration, can be mounted in series with each of said correlation means, downstream of the latter in the information forwarding direction. The addition and subtraction means, in this case, do the addition and the subtraction of the various possible associations of the delayed and non-delayed signals, and thus form several sum and difference signals, which makes it possible to increase the range of calculation of the speeds capable of being determined by the device in accordance with the invention.

The present invention can be applied to various types of radar, in particular to a synthetic-aperture radar, installed on board an aircraft and intended for territorial surveillance.

In this case, the device in accordance with the invention may advantageously form, from information available at the output of said computer:

on the one hand, an image of the fixed and moving targets situated on said territory, from said sum signal; and on the other hand, an image of the moving targets, from said difference signal, said difference signal further making it possible to calculate the speed of said moving targets.

The figures of the attached drawing will give a good understanding of how the invention can be produced. In these figures, identical references designate similar elements.

DETAILED DESCRIPTION OF A PREFERRED EMBODIMENT

Figure 1:
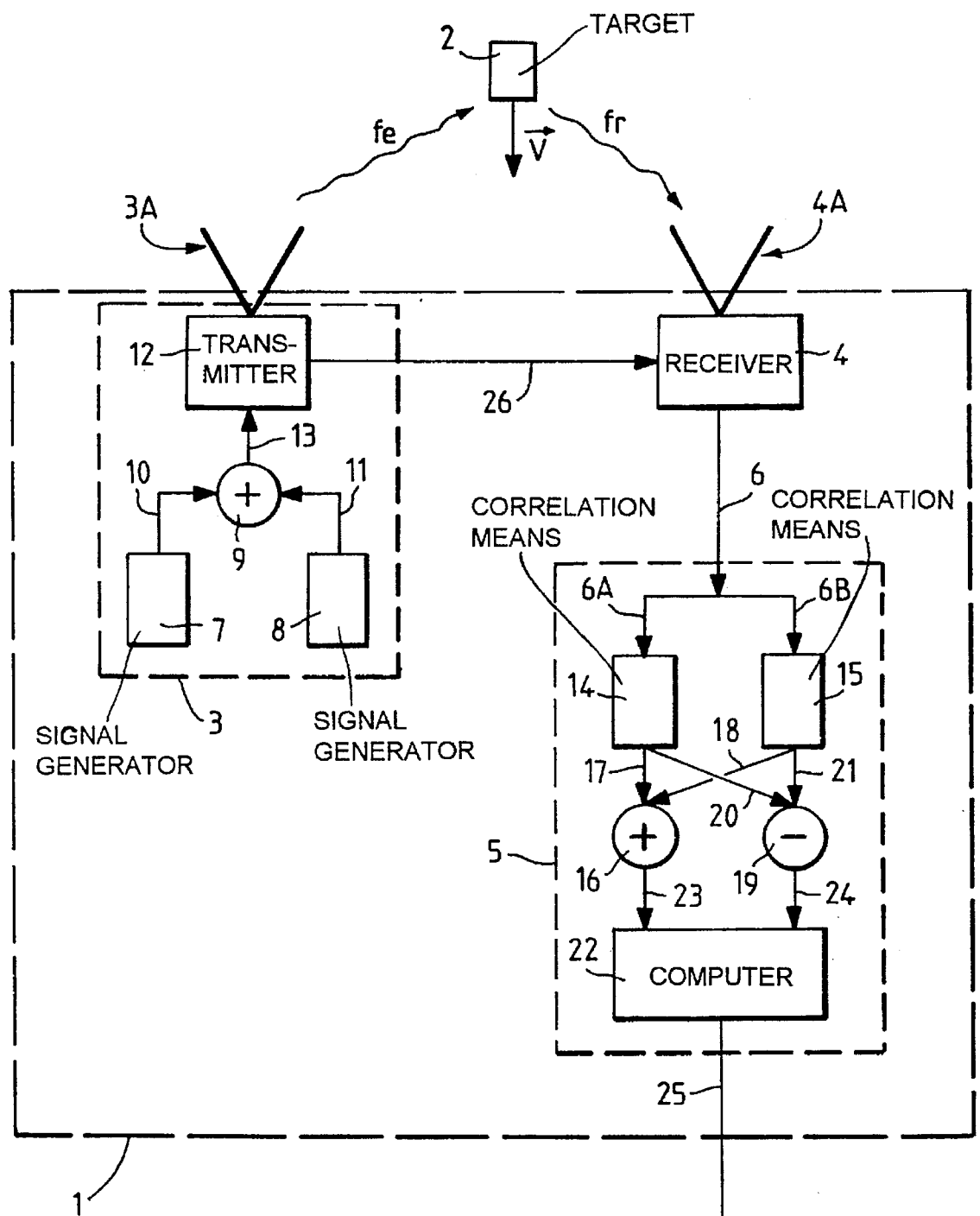
FIG. 1 is the block diagram of a device in accordance with the invention.

The remote detection device 1, of the pulse-compression radar or sonar type, produced in accordance with the invention is represented diagrammatically in FIG. 1. Said device 1 which makes it possible, in a known way, with very great precision, to determine the distance between said device 1 and a target, in particular a moving target 2, is improved according to the invention so as to be able additionally to determine the speed V of said target 2, toward said device 1.

It is known that pulse-compression radars are particularly suitable for taking measurements of distances intended for mapping, or used when tracking airborne vehicles.

In the known way, said remote detection device 1 includes:

- a transmitter system 3 capable of transmitting pulses frequency-modulated with linear and continuous variation laws, by means of an antenna 3A, as illustrated by an arrow fe;
- a receiver system 4 capable of picking up the pulses transmitted by said transmitter system 3 and reflected by said target 2, by means of an antenna 4A, as illustrated by an arrow fr; and
- a signal processing system 5 linked by a link 6 to said receiver system 4.

Generally, said antennae 3A and 4A are produced in the form of a single antenna. These antennae 3a and 4a have, nevertheless, been distinguished in FIG. 1 so as to differentiate clearly, in the device 1, the part intended for transmission from that intended for reception.

It will be noted moreover that the receiver system 4 of the known type does not have to be produced specifically for implementing the present invention. For that reason, said receiver system 4, which in a known way includes at least one mixer, a local oscillator and an intermediate-frequency amplifier which are not represented, is not described in further detail in the description which follows.

It is a different matter for the transmitter system 3 and the signal-processing system 5 which, in accordance with the invention, are formed specifically to allow the speed V of the target 2 to be determined.

In fact, according to the invention, said transmitter system 3, as represented in FIG. 1, includes:

- a signal generator 7 capable of generating a signal frequency-modulated by an increasing variation law;
- a signal generator 8 capable of generating a signal frequency-modulated by a decreasing variation law;
- a summing means 9 linked by means of links 10 and 11 respectively to said signal generators 7 and 8 and grouping together the signals generated by said signal generators 7 and 8; and
- a transmission means 12 equipped with said antenna 3A and linked by a link 13 to said summing means 9, said transmission means 12 being controlled by the signals supplied by said summing means 9 and transmitting corresponding pulses, namely electromagnetic waves (or groups of oscillations) in the case of a radar and sound waves in the case of a sonar.

The signal processing system 5, in accordance with the invention, itself includes:

- a correlation means 14 intended to process the pulses frequency-modulated by an increasing variation law and picked up by said receiver system 4, said correlation means 14 being linked to said receiver system 4 by one branch 6A of the link 6 split into two branches 6A and 6B;
- a correlation means 15 linked by the branch 6B of the link 6 to the receiver system 4 and intended to process the pulses frequency-modulated by a decreasing variation law;
- an addition means 16 linked by links 17 and 18 respectively to said correlation means 14 and 15;
- a subtraction means 19 linked to said correlation means 14 and 15 respectively via links 20 and 21; and
- a computer 22 linked to said addition 16 and subtraction 19 means respectively by links 23 and 24, and capable of transmitting information by a link 25.

It will be noted that the device 1 in accordance with the invention can, obviously, be implemented by using the techniques of digital signal processing.

The method of determining the speed V of the moving target 2 by said previously described remote detection device 1 is now presented.

Figure 2:
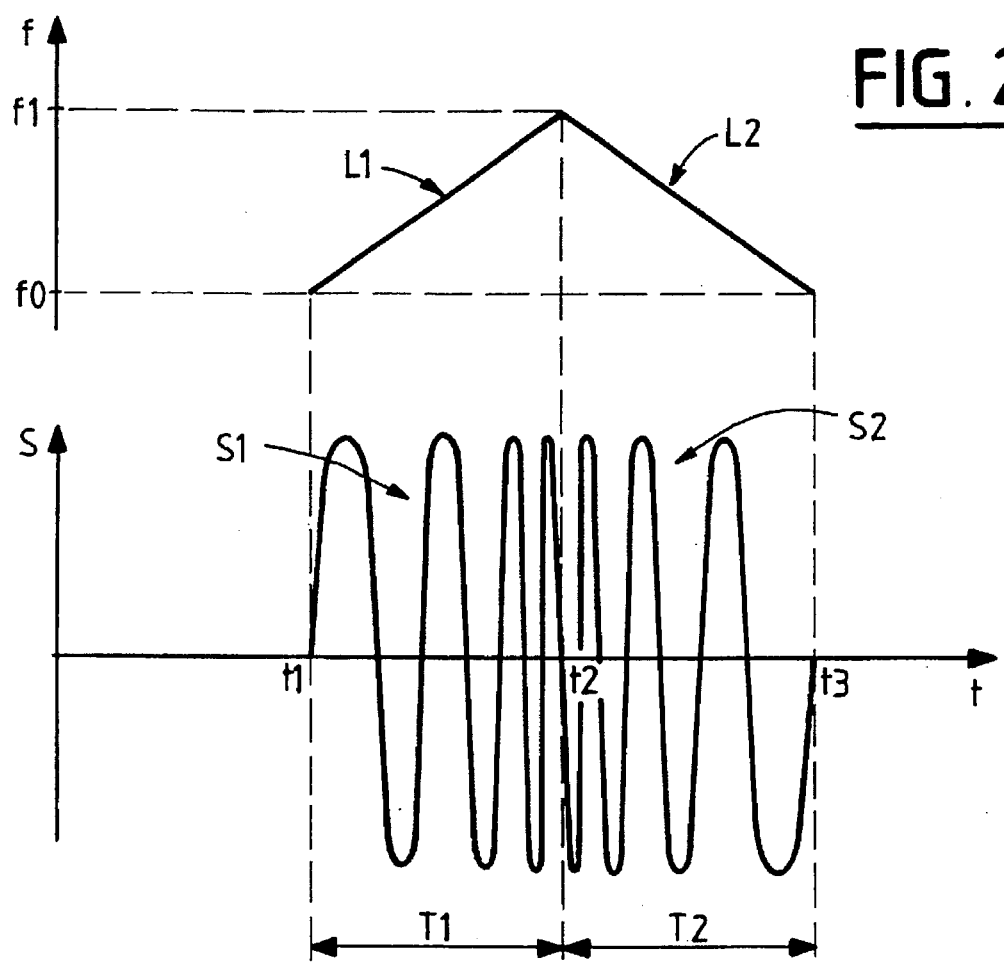
FIG. 2 illustrates the determining of the frequency-modulated pulses intended to be transmitted.

According to the invention, the signal generator 7 generates a signal S1 of duration T1, frequency-modulated with a continuous, linear and increasing variation law L1, as represented in FIG. 2. The frequency f of said signal S1 varies, in this case, from a frequency f0 to a frequency f1.

The signal generator 8 itself generates a signal S2 of duration T2, frequency modulated with a continuous, linear and decreasing variation law L2, the frequency f of said signal S2 decreasing from said frequency f1 to said frequency f0. Said durations T1 and T2 are equal.

In order to bring fully to light the correspondence existing between these two signals S1 and S2, they have been joined together in the representation of FIG. 2, the signal S1 being formed between instants t1 and t2 and the signal S2 between instants t2 and t3.

The two signals S1 and S2 thus defined are forwarded to the summing means 9 which groups them together into a double signal S which is formed in such a way that said signals S1 and S2 can be transmitted simultaneously.

To this end, the double signal S thus formed and forwarded to the transmission means 12 is transmitted by the latter in the form of pulses toward the moving target 2.

After reflection on said moving target 2, said signal S is picked up by the receiver system 4 and it is processed by the signal processing system 5.

The part S1 of the signal S picked up is processed in the correlation means 14, and the part S2 of said signal S is processed in the correlation means 15. Said correlation means 14 and 15 process the received signals in a known way, so as to increase their amplitudes and to reduce their durations. Said means 14 and 15 to this end use the initial signal S, which is forwarded by the transmitter system 3 to the receiver system 4 via a link 26, and via the latter to said correlation means 14 and 15.

Figure 3:
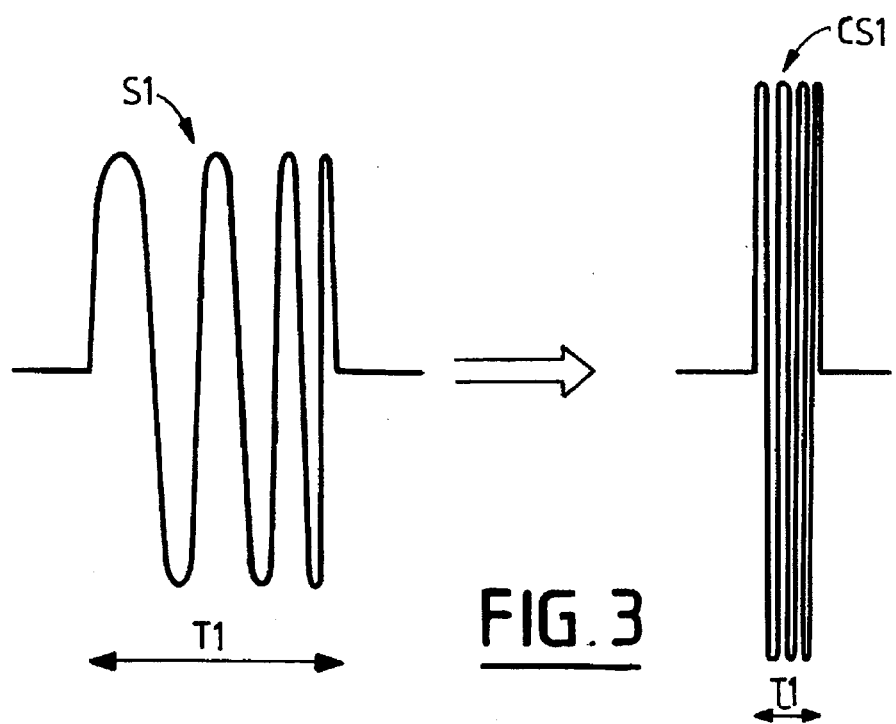
FIG. 3 shows the result of the compression of a signal picked-up and processed.

In FIG. 3, the processing of the part S1 of the signal S by the correlation means 14 has been represented. Said part S1, of duration T1 at the input to said correlation means 14, exhibits, at its output, as represented in FIG. 3, a form CS1 of duration $\tau 1$ which satisfies the following relation $\tau 1 = (T1)/\rho$, with $\rho$ the signal compression ratio. The part S2 of the signal S is processed identically by the correlation means 15.

The signals thus processed are slightly shifted in time at the output respectively of said correlation means 14 and 15, but the phases of these signals are very different, by reason of the Doppler effect processed differently in the two cases. From this phase shift, it is possible to determine the speed of the target 2.

Figure 4:
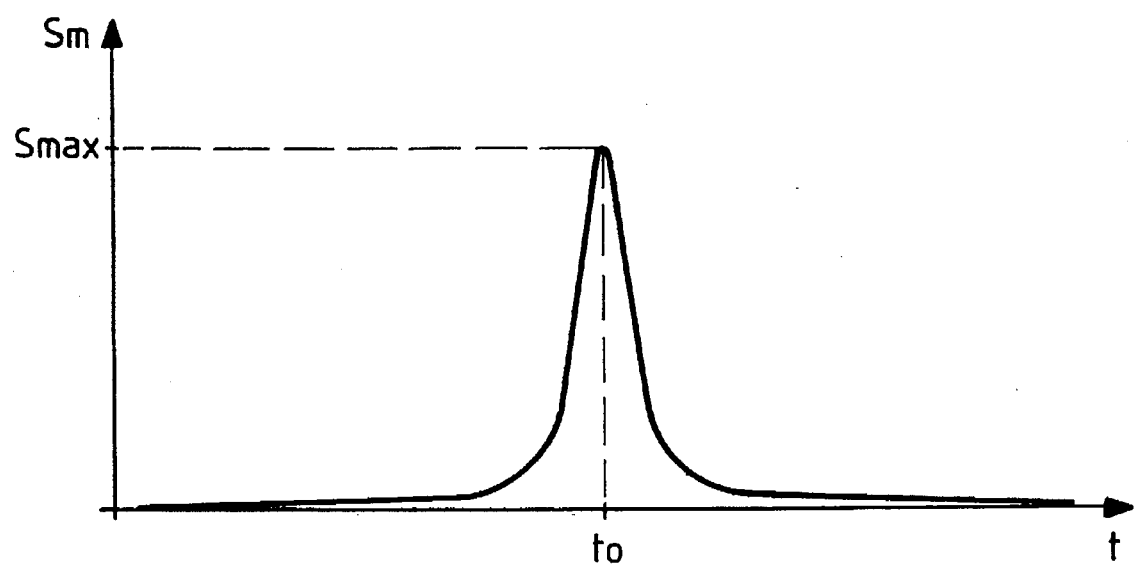
FIG. 4 shows the sum signal formed in accordance with the invention.

To this end, the signals S1 and S2 thus processed and correlated are added by the addition means 16. At the output of said addition means 16, a sum signal Sm is obtained, represented in FIG. 4. Said sum signal Sm exhibits a maximum Smax at a time to. From said sum signal Sm, it is possible in a known way to determine the distance between the device 1 and the target 2.

Figure 5:
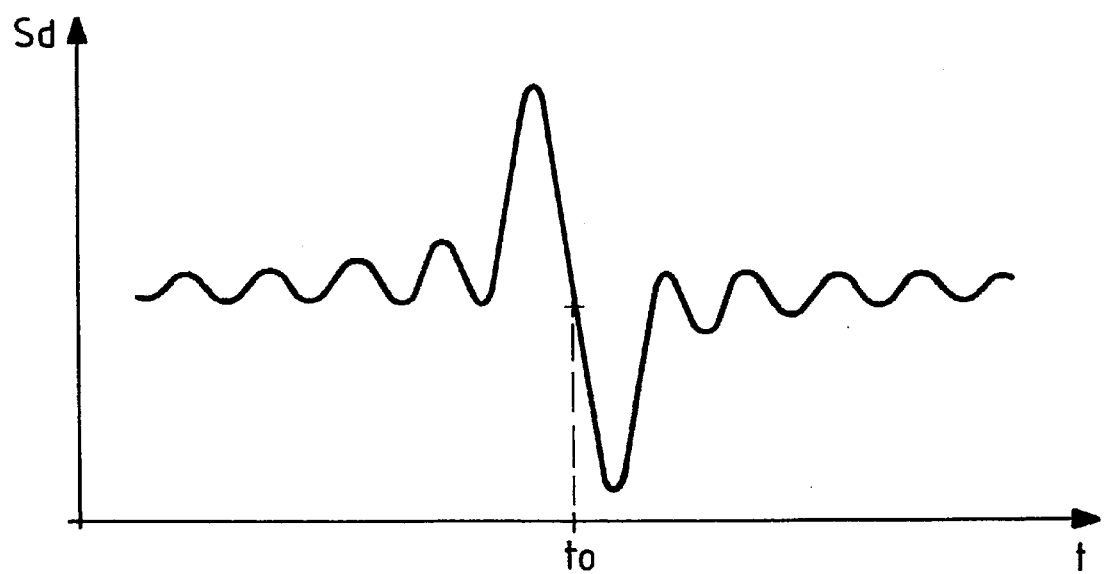
FIG. 5 shows the difference signal formed in accordance with the invention.

Moreover, the signals processed by the correlation means 14 and 15 are forwarded to the subtraction means 19 which performs the subtraction of the two received signals. In this case, at the output of said subtraction means 19, a difference signal Sd is obtained, the real component of which has been represented in FIG. 5.

Said difference signal Sd exhibits a slope which depends on the speed V of the moving target 2, at the instant to when the sum signal Sm is a maximum.

In order to determine said speed, it is necessary, for reasons of order of magnitude, to divide the difference signal Sd by the maximum value Smax of the sum signal Sm, so as to obtain a signal $S0 = (Sd)/Smax$.

The variation in the derivative S0' of said signal S0, determined at the instant to when the sum signal Sm is a maximum, is proportional to the speed V.

Thus the following relation is obtained: $V = K.S0'$, K being a proportionality constant capable of being determined by calibration and recorded in the computer 22.

Consequently, said computer 22 which, on the one hand, knows said proportionality constant K and, on the other hand, is capable of determining the value S0' from the information received from the addition means 16 and from the subtraction means 19, can calculate the speed V of said moving target 2 from the abovementioned relationship, and forward the result via the link 25, for example to a display means, not represented. The calculation of the speed can thus be performed iteratively after each detection of said simultaneously transmitted signals S1 and S2.

In the previously described embodiment, the two signals S1 and S2 are therefore transmitted simultaneously during the same transmission period.

However, according to a variant embodiment of the invention, not represented, said signals S1 and S2 can he transmitted successively after a defined time delay Tr. For example, the signal S1 is transmitted at an instant t and the signal S2 is transmitted at a subsequent instant t+Tr. In this case, it is necessary to take this time delay Tr into account during processing of the signals in the signal processing system 5.

To this end, said signal processing system 5 includes a delay system, not represented, mounted in series with the correlation means intended to process the signal transmitted first, namely the correlation means 14 in the example envisaged above.

This delay system can be mounted upstream or downstream of said correlation means 14 in the information forwarding direction, and is intended to delay the forwarding of the signal by said duration Tr, either to the correlation means 14 when it is arranged upstream thereof, or to the addition 16 and subtraction 19 means when it is arranged downstream, that is to say at the output of said correlation means 14.

According to another variant embodiment of the invention, such a delay system is mounted in series with each of said correlation means 14 and 15, downstream of the latter in the information forwarding direction, and said addition 16 and subtraction 19 means do the addition and the subtraction of the various possible associations of the delayed and non-delayed signals then generated, and thus form several sum and difference signals, which makes it possible to increase the range of calculation of the speeds capable of being determined by the device in accordance with the invention.

It will be noted that the device 1 in accordance with the invention can be implemented on many types of radar, for example on a radar equipped with a filter for eliminating fixed echoes, making it possible to measure the speeds of moving targets, or on a pulse Doppler-effect radar, making it possible to remove the uncertainty in the speed measurement picked off at the output of the filters of said radar.

However, the present invention is particularly advantageous when the remote detection device is produced in the form of a synthetic-aperture radar placed on board an aircraft for the surveillance of territory overflown by said aircraft. Said radar can then form mapping images of overflow terrain from information supplied by the computer 22. In this case, said radar can form two different images: a first image obtained from information supplied by the addition means 16 and a second image obtained from information supplied by the subtraction means 19.

Said first image makes it possible to view all the reflecting points on said terrain, whether they are immobile or moving (on condition that the movements are not too fast, so as to avoid effects of defocussing of the synthetic-aperture radar). However, the moving points are projected on the image at a position spaced away from their true position, by a specific effect of the processing of moving targets by the synthetic-aperture radar.

The second image, for its part, makes it possible to view only the moving targets and to measure their speeds of movement. The speeds thus measured can then be used to correct the errors in the position of the reflecting points on said first image intended to form the corresponding mapping image of the terrain overflown.

I claim:

1. A method for determining, by means of a remote detection device comprising a pulse-compression radar or sonar, the speed of an object moving toward said remote detection device, said method comprising the steps of:
   (a) transmitting two associated pulses which are frequency-modulated, one of said pulses having a continuously linearly increasing frequency and the other of said pulses having a continuously linearly decreasing frequency;
   (b) detecting said pulses after said pulses are reflected from said moving object;
   (c) processing said pulses after said pulses are detected to reduce the duration of said pulses and to increase the amplitude of said pulses, said step (c) comprising the steps of:
      (c1) forming a sum signal by adding said pulses together;
      (c2) forming a difference signal by subtracting one of said pulses from the other of said pulses;
      (c3) dividing the difference signal by the maximum value of the sum signal to form a first processed signal;
      (c4) calculating the derivative of the first processed signal to form a second processed signal; and
      (c5) determining the speed of said moving object based upon the value of said second processed signal at a point in time corresponding to the point in time at which the sum signal has said maximum value.

2. The method as claimed in claim 1, wherein the two pulses are transmitted simultaneously.

3. The method as claimed in claim 1, wherein the two pulses are transmitted successively after a defined delay time, and wherein this delay time is taken into account during the detection and during the processing of the pulses, after they have been reflected on the moving object.

4. The method as claimed in claim 1, wherein the distance between said moving object and the remote detection device is determined from said sum signal.

5. A remote detection device for determining the speed of an object moving toward said remote detection device, said remote detection device comprising:
   a transmitter system for transmitting two associated pulses which are frequency-modulated, one of said pulses having a continuously linearly increasing frequency and the other of said pulses having a continuously linearly decreasing frequency;
   a receiver system for detecting said pulses transmitted by said transmitter system after said pulses are reflected from said moving object; and
   a signal processing system associated with said receiver system, said signal processing system comprising:
      two correlation means for reducing the duration of and increasing the amplitude of said pulses, each of said two correlation means reducing the duration of and increasing the amplitude of one of said pulses;
      addition means for generating a sum signal by adding said pulses together;
      subtraction means for generating a difference signal by subtracting one of said pulses from the other of said pulses;
      a computer coupled to said addition means and said subtraction means for determining the speed of the moving object based on said sum signal and said difference signal.

6. The device as claimed in claim 5, wherein said transmitter system includes:

a signal generator capable of generating a signal modulated by increasing frequencies;

a signal generator capable of generating a signal modulated by decreasing frequencies;

a summing means grouping together the signals generated by said signal generators; and a transmission means controlled by said signals and transmitting corresponding pulses.

7. The device as claimed in claim 5, the two pulses being transmitted successively after a defined duration, wherein a delay system is mounted in series with the correlation means processing the pulse transmitted first, said delay system delaying the forwarding of the received information for a time corresponding to said defined duration.

8. The device as claimed in claim 5, wherein a delay system, delaying forwarding of the information received for a defined duration, is mounted in series with each of said correlation means, downstream of the latter in the information forwarding direction, and wherein said addition and subtraction means do the addition and the subtraction of the various possible associations of the delayed and non-delayed signals, the sum and difference signals formed then making it possible to increase the range of calculated speeds.

9. The remote detection device as claimed in claim 5, of the synthetic-aperture radar type, installed on board an aircraft and intended for territorial surveillance, which device forms, from information available at the output of said computer:

an image of the fixed and moving targets situated on said territory, from said sum signal; and an image of the moving targets, from said difference signal, said difference signal further making it possible to calculate the speed of said moving targets.

\* \* \* \* \*

UNITED STATES PATENT AND TRADEMARK OFFICE
CERTIFICATE OF CORRECTION

PATENT NO. : 5,659,320

DATED : August 19, 1997

INVENTOR(S) : POUIT

It is certified that error appears in the above-identified patent and that said Letters Patent is hereby corrected as shown below:

On the title page,
Item [73] Assignee "Societe Nationale Industrielle Aerospatiale" should be --Aerospatiale Societe Nationale Industrielle--

Signed and Sealed this

Eleventh Day of November, 1997

*Attest:*

BRUCE LEHMAN

*Attesting Officer*  *Commissioner of Patents and Trademarks*